(12) United States Patent
Deng et al.

(10) Patent No.: US 8,709,703 B2
(45) Date of Patent: Apr. 29, 2014

(54) METHODS FOR FORMING PATTERNED STRUCTURES

(75) Inventors: Xuegong Deng, Piscataway, NJ (US); Jian Jim Wang, Orefield, PA (US); Lei Chen, Clarksburg, MD (US); Anguel N. Nikolov, Los Angeles, CA (US); Nada O'Brien, Santa Rosa, CA (US); Xiaoming Liu, Orefield, PA (US)

(73) Assignee: Polarization Solutions, LLC, Somerset, NJ (US)

( * ) Notice: Subject to any disclaimer, the term of this patent is extended or adjusted under 35 U.S.C. 154(b) by 1384 days.

(21) Appl. No.: 12/053,058

(22) Filed: Mar. 21, 2008

(65) Prior Publication Data
US 2009/0053655 A1 Feb. 26, 2009

Related U.S. Application Data

(63) Continuation of application No. 11/838,436, filed on Aug. 14, 2007, now abandoned.

(60) Provisional application No. 60/837,829, filed on Aug. 15, 2006.

(51) Int. Cl.
*G03F 7/20* (2006.01)
*C23F 1/02* (2006.01)

(52) U.S. Cl.
USPC ............................................. 430/321; 216/24

(58) Field of Classification Search
None
See application file for complete search history.

(56) References Cited

U.S. PATENT DOCUMENTS

| 4,730,330 A | 3/1988 | Plihal et al. |
| 5,340,637 A | 8/1994 | Okai et al. |

(Continued)

FOREIGN PATENT DOCUMENTS

| JP | 2005-202104 A | 7/2005 |
| KR | 10-2005-0017871 A | 2/2005 |
| WO | 2005123277 | 12/2005 |

OTHER PUBLICATIONS

Liu, X. et al., "Large Area, 38 nm Half-Pitch Grating Fabrication by Using Atomic Spacer Lithography from Aluminum Wire Grids," *Nano Lett.* (Letter), 6(12): 2723-2727 (2006).

*Primary Examiner* — John A. McPherson
(74) *Attorney, Agent, or Firm* — Onello & Mello, LLP

(57) ABSTRACT

In general, in a first aspect, the invention features a method that includes forming a first layer comprising a first material over a surface of a second layer, wherein forming the first layer includes sequentially forming a plurality of monolayers of the second material over the surface of the second layer, the second layer comprises a plurality of rows of a second material extending along a first direction and spaced from one another in a second direction orthogonal to the first direction, and the first layer conforms to the surface of the second layer. The method further includes removing portions of the first layer to produce a plurality of rows of the first material extending along the first direction and spaced from one another in the second direction and removing portions of a third layer comprising a third material, where the portions correspond to intervals between the second plurality of rows so that removing the portions forms a plurality of rows of the third material extending along the first direction and spaced apart from one another. The first and second materials are different.

32 Claims, 7 Drawing Sheets

(56) References Cited

U.S. PATENT DOCUMENTS

| | | |
|---|---|---|
| 5,615,041 A | 3/1997 | Field et al. |
| 6,317,264 B1 | 11/2001 | Li et al. |
| 6,665,119 B1 | 12/2003 | Kurtz et al. |
| 6,873,764 B2 | 3/2005 | Maisenholder et al. |
| 7,158,302 B2 | 1/2007 | Chiu et al. |
| 7,466,484 B2 | 12/2008 | Mi et al. |
| 2005/0277063 A1* | 12/2005 | Wang et al. .................. 430/311 |
| 2006/0215263 A1 | 9/2006 | Mi et al. |
| 2007/0238299 A1* | 10/2007 | Niroomand et al. .......... 438/700 |

\* cited by examiner

METHODS FOR FORMING PATTERNED STRUCTURES

CROSS-REFERENCE TO RELATED APPLICATIONS

This application is a continuation of U.S. patent application Ser. No. 11/838,436, filed on Aug. 14, 2007, which claims priority to Provisional Patent Application No. 60/837,829, entitled "METHODS FOR FORMING PATTERNED STRUCTURES," filed on Aug. 15, 2006, the entire contents both of which are incorporated herein by reference.

TECHNICAL FIELD

This disclosure relates to patterned structures, articles and systems containing such patterned structures, and methods for making such patterned structures.

BACKGROUND

Patterned structures are utilized in integrated circuits and in certain optical devices. Optical devices that include patterned structures include gratings, for example, and are commonly used where manipulation of light is desired. Examples of optical devices include polarizers, optical filters, beamsplitters (e.g., polarizing and non-polarizing beamsplitters) and retarders (e.g., quarter waveplates).

SUMMARY

In general, in a first aspect, the invention features a method that includes forming a first layer comprising a first material over a surface of a second layer, wherein forming the first layer includes sequentially forming a plurality of monolayers of the second material over the surface of the second layer, the second layer comprises a plurality of rows of a second material extending along a first direction and spaced from one another in a second direction orthogonal to the first direction, and the first layer conforms to the surface of the second layer. The method further includes removing portions of the first layer to produce a plurality of rows of the first material extending along the first direction and spaced from one another in the second direction and removing portions of a third layer comprising a third material, where the portions correspond to intervals between the second plurality of rows so that removing the portions forms a plurality of rows of the third material extending along the first direction and spaced apart from one another. The first and second materials are different.

Implementations of the method can include one or more of the following features. For example, the rows of the second material can be arranged periodically in the second direction with a period $\Lambda$. The rows of the first material can be arranged periodically in the second direction with a period $\lambda$. $\lambda$ can be smaller than $\Lambda$. For example, $\lambda$ can be about $\Lambda/2$. $\Lambda$ can be about 200 nm or less (e.g., about 150 nm or less).

In some embodiments, a width in the second direction of each row of the second material is about $\Lambda/4$. A thickness of the first layer in a third direction orthogonal to the first and second directions can be about $\Lambda/4$.

The first material can be selected from the group consisting of $SiO_2$, $SiN_x$, $Si$, $SiON_x$, $Si_3N_4$, $Al_2O_3$, $ZrO_2$, $Ta_2O_5$, $TiO_2$, $HfO_2$, $Nb_2O_5$, and $MgF_2$. The second material can be an inorganic material. The second material can be a metal or a dielectric material. The third material can be an inorganic material. The third material can be a metal, such as aluminum.

In some embodiments, the rows of the second material are formed by exposing portions of a layer of a resist to radiation to produce an exposure pattern in the layer of the resist, removing portions of the layer of the resist to produce a plurality of rows of the resist extending along the first direction and spaced apart from each other, and removing portions of the a layer of the second material that correspond to removed portions of the layer of the resist to form the rows of the second material.

Removing portions of the first layer can include etching the first layer. In certain embodiments, the first layer is etched anisotropically.

Removing portions of the third layer can include etching the third layer (e.g., with chlorine gas).

The rows of the third material can form a grating with a grating period of about 100 nm or less (e.g., about 50 nm or less).

In some embodiments, the method can include depositing a fourth material between the rows of the third material, wherein the third and fourth materials are different. The method can include forming one or more additional layers over the rows of the third material.

The rows of the third material can form a layer that is birefringent for light of wavelength $\lambda$ propagating through the layer along an axis, wherein $\lambda$ is between 100 nm and 2,000 nm.

In some embodiments, the rows of the third material form a layer that transmits about 50% or more (e.g., about 60% or more, about 70% or more, about 80% or more, about 85% or more, about 90% or more, about 95% or more, about 98% or more) of light of wavelength $\lambda$ having a first polarization state incident on the layer along a path, the layer blocks about 80% or more (e.g., about 85% or more, about 90% or more, about 95% or more, about 98% or more, about 99% or more) of light of wavelength $\lambda$ having a second polarization state incident on the layer along the path, the first and second polarization states being orthogonal, and $\lambda$ is between about 100 nm and about 2,000 nm.

In general, in another aspect, the invention features a method that includes using atomic layer deposition to form a layer of a first material over a plurality of spaced-apart ridges of a second material, the ridges of the second material being supported by a layer of a third material, removing portions of the layer of the first material to form a plurality of spaced-apart ridges of the first material, wherein adjacent ridges of the second material are separated by two ridges of the first material, and removing portions of the layer of the third material from between the ridges of the first material to provide a plurality of spaced-apart ridges of the third material. Implementations of the method can include one or more of the features of the first aspect.

Embodiments can include one or more of the following advantages.

For example, the methods can be used to form structures (e.g., periodic structures) of relatively small size (e.g., small periods). For example, periodic structures with periods less than about 100 nm (e.g., less than about 80 nm, less than about 60 nm, less than about 40 nm) can be formed. The structures do not significantly diffract optical radiation at wavelengths larger than the period of the structures. Thus, the structures formed using the methods disclosed herein can be used in optical devices and systems that manipulate short-wavelength optical radiation.

Periodic structures with successively smaller periods can be formed by repeating the method steps. For example, multiple sacrificial layers can be provided in a starting multilayer article. Each sacrificial layer can be used to produce a periodic structure with a period that is reduced by a factor of two relative to a periodic structure produced from a prior sacrificial layer. As a result, periodic structures with relatively small periods can be produced starting from a periodic structure with a relatively large period.

The methods can be used to form periodic structures without the use of a sacrificial layer. For example, photoresist layers exposed to form periodic pattern can provide a template for the deposition of conformal coating layers. The deposited conformal coating layers can then be selectively etched to produce a periodic structure with a period reduced by a factor of two relative to the period of the pattern in the photoresist layers. Forming periodic structures without use of a sacrificial layer reduces the number of method steps and reduces the amount of material used to form the periodic structures.

Conformal layers can be deposited using processes that provide substantial control over the thickness of the conformal layer. For example, in some embodiments, conformal layers can be deposited monolayer by monolayer, allowing for thickness control on the order of one monolayer. For example, atomic layer deposition can be used to form conformal layers. Accurate control of the conformal layer thickness can allow for more accurate control over the fidelity of etch masks formed using methods disclosed herein.

The methods can be used to form structures from a variety of materials. Accordingly, the methods can be used to form a variety of different devices, such as different optical devices. As an example, materials, such as aluminum, that have relatively low transmission in certain regions of the electromagnetic spectrum, such as the deep ultraviolet region, can be used to form polarizers which operate in these regions of the spectrum. As another example, materials, such as dielectric materials, that have relatively high transmission in certain regions of the electromagnetic spectrum, such as the deep ultraviolet region, can be used to form retarders which operate in these regions of the spectrum.

Other features and advantages of the invention will be apparent from the description, drawings, and claims.

DESCRIPTION OF DRAWINGS

Like reference symbols in the various drawings indicate like elements.

DETAILED DESCRIPTION

We disclose herein methods for forming structures having dimensions of about 100 nm or less. For example, the methods can be used to form periodic structures (e.g., gratings) having periods of about 100 nm or less.

Figure 1:
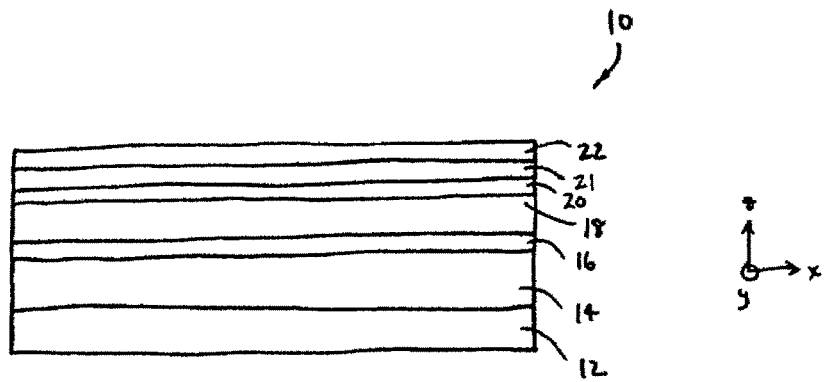
FIG. 1 is a side view of a multilayer article with a photoresist layer.

Referring to FIG. 1, in some embodiments, a multilayer article 10 is used as a starting material for the fabrication of periodic structures. FIG. 1 includes x-y-z axes for reference. Multilayer article 10 includes a substrate layer 12, a grating layer 14, a lower etch stop layer 16, a sacrificial layer 18, an upper etch stop layer 20, and two photoresist layers 21 and 22.

In general, the thickness and composition of substrate layer 12 is selected based on the end use application of the article. For example, where the article is to be used in an optical device, the material of substrate layer 12 is typically selected based on the optical properties of the material in the wavelength region of interest (e.g., in the visible or ultraviolet portions of the spectrum). In general, substrate layer 12 can be formed from any material compatible with the manufacturing processes used to produce the article that can support the other layers. In certain embodiments, substrate layer 12 is formed from a glass, such as BK7 (available from Abrisa Corporation), borosilicate glass (e.g., pyrex available from Corning), aluminosilicate glass (e.g., C1737 available from Corning), or quartz/fused silica. In some embodiments, substrate layer 12 can be formed from a crystalline material, such as quartz, calcium fluoride, or a non-linear optical crystal (e.g., $LiNbO3$ or a magneto-optical rotator, such as garnett) or a crystalline (or semicrystalline) semiconductor (e.g., Si, InP, GaN, or GaAs). Substrate layer 12 can also be formed from an inorganic material, such as a polymer (e.g., a plastic).

In some embodiments, the thickness of substrate layer 12 in the z-direction can be about 20 µm or more, (e.g., about 50 µm or more, about 100 µm or more, about 200 µm or more, about 500 µm or more, about 1 mm or more, about 5 mm or more). In certain embodiments, the thickness of substrate layer 12 in the z-direction can be about 10 µm or less (e.g., about 8 µm or less, about 6 µm or less, about 4 µm or less, about 2 µm or less, about 1 µm or less).

Grating layer 14 is supported by substrate layer 12. Grating layer 14 can be formed from a variety of materials. In general, the material (or materials) from which grating layer 14 is formed depend on the end use application of the article. Where the article is to be used in an optical device the material is selected based on its optical properties in the wavelength region of interest. For example, in embodiments where the article is a polarizer, grating layer 14 can be formed from a material that has relatively low transmittance (e.g., relatively high reflectance and/or absorption) in the wavelength region of interest. As an example, Al can be used to form grating layer 14 where the article is a polarizer for the visible or UV portions of the spectrum. In certain embodiments, grating layer 14 can be formed from a material that has a relatively high transmittance in the wavelength region of interest. For example, where the article is a retarder, a material with relatively high transmittance can be used. Various dielectric materials (e.g., $SiO_2$ and $TiO_2$), for example, have relatively high transmittance in the visible and UV portions of the spectrum.

In general, grating layer 14 can be formed from inorganic and/or organic materials. Examples of inorganic materials include metals, semiconductors, and inorganic dielectric materials (e.g., glass). Examples of organic materials include polymers. As discussed previously, in some embodiments, grating layer 14 includes one or more dielectric materials, such as dielectric oxides (e.g., metal oxides), fluorides (e.g., metal fluorides), sulphides, and/or nitrides (e.g., metal nitrides). Examples of oxides include $SiO_2$, $Al_2O_3$, $Nb_2O_5$, $TiO_2$, $ZrO_2$, $HfO_2$, $SnO_2$, $ZnO$, $ErO_2$, $Sc_2O_3$, and $Ta_2O_5$. Examples of fluorides include $MgF_2$. Other examples include ZnS, $SiN_x$, $SiO_yN_x$, AlN, TiN, and HfN.

In certain embodiments, grating layer 14 includes a metal, such as Au, Ag, Al, Cr, and Cu. Grating layer 14 can be formed from more than one metal (e.g., from a metal alloy). In some embodiments, grating layer 14 is formed from a nanolaminate material, which is a composite material that is composed of layers of at least two different materials and the layers of at least one of the materials are extremely thin (e.g., between one and about 10 monolayers thick). Optically, nanolaminate materials have a locally homogeneous index of refraction that depends on the refractive index of its constituent materials. Varying the amount of each constituent material can vary the refractive index of a nanolaminate. Examples of nanolaminate portions include portions composed of $SiO_2$ monolayers and $TiO_2$ monolayers, $SiO_2$ monolayers and $Ta_2O_5$ monolayers, or $Al_2O_3$ monolayers and $TiO_2$ monolayers.

Grating layer 14 can be formed by a variety of techniques. In certain embodiments, grating layer 14 can be formed via atomic layer deposition (ALD). In some embodiments, grating layer 14 can be formed using techniques such as chemical vapor deposition (CVD), plasma-enhanced CVD, physical vapor deposition (PVD), sputtering, electron beam evaporation or thermal evaporation.

Generally, the technique used to form grating layer 14 depends on the type of material forming the grating layer. Metal layers, for example, can be formed by evaporation techniques (e.g., thermal evaporation or electron beam evaporation). In embodiments, metal layers are formed by evaporating the metal onto a surface of substrate layer 12 at relatively fast rates, such as about 5 Angstroms per second or more (e.g., about 10 Angstroms per second or more, about 12 Angstroms per second or more, about 15 Angstroms per second or more), for example. Fast deposition rates can improve the purity of the metal layer by reducing the amount of impurities (such as oxygen) that can incorporate into the film as it is deposited.

In some embodiments, substrate layer 12 can be cooled prior to and/or during metal deposition. For example, the substrate can be cooled to about 0° C. or less (e.g., about −20° C. or less, about −50° C. or less). Cooling the substrate can increase the size of metal grains formed on the substrate during deposition. It is believed than lower substrate temperature can reduce the kinetic energy of the metal clusters that tend to prevent the clusters from forming larger grains. Larger metal grain size may be beneficial by providing improved optical characteristics, such as higher reflectance compared to metal layers composed of smaller grains. Moreover, grating layers having short periods can be more easily formed from metal layers having larger grain sizes.

Evaporation can also be performed under relatively high vacuums, such as vacuums of about $10^{-6}$ Torr or less (e.g., about $5 \times 10^{-7}$ Torr or less, about $2 \times 10^{-7}$ Torr or less). High vacuum deposition can also improve the purity of the metal layer by reducing the amount of impurities (such as oxygen) present in the vicinity of the deposited layer as it is formed, thereby reducing the amount of impurities that are incorporated in the film.

In some embodiments, substrate layer 12 is positioned relatively far from the source of the deposited metal in the deposition chamber (e.g., about 12 inches or more, about 15 inches or more, about 20 inches or more, about 24 inches or more). This can increase the uniformity of the deposited material across the surface of substrate layer 12 relative to systems in which the source is positioned closer to the substrate.

In general, the thickness of grating layer 14 in the z-direction can vary as desired. Typically, the thickness of grating layer 14 is selected based on the desired properties of the grating to be formed in grating layer 14. In some embodiments, grating layer 14 has a thickness of about 50 nm or more (e.g., about 75 nm or more, about 100 nm or more, about 125 nm or more, about 150 nm or more, about 175 nm or more, about 200 nm or more, about 225 nm or more, about 250 nm or more, about 300 nm or more, about 400 nm or more, about 500 nm or more, about 1,000 or more, such as about 2,000 nm). In certain embodiments, the thickness of grating layer 14 can be about 1000 nm or less (e.g., about 800 nm or less, about 600 nm or less, about 500 nm or less, about 400 nm or less).

Upper etch stop layer 20 is formed from a material resistant to the etching process used to etch photoresist layers 21 and 22. Upper etch stop layer 20 should also be compatible with the material forming sacrificial layer 18. Lower etch stop layer 16 is formed from a material resistant to the etching process used to etch the material from which sacrificial layer 18 is formed. The material forming lower etch stop layer 16 should also be compatible with the material forming grating layer 14 and with the material forming sacrificial layer 18. Examples of materials that can form etch stop layer include $HfO_2$, $SiO_2$, $Ta_2O_5$, $TiO_2$, $SiN_x$, or metals (e.g., Cr, Ti, Ni).

The thickness of etch stop layers 16 and 20 can vary as desired. Typically, etch stop layers 16 and 20 are sufficiently thick to prevent significant etching of sacrificial layer 18 and grating layer 14, respectively. In some embodiments, etch stop layers 16 and/or 20 have a thickness in the z-direction of about 500 nm or less (e.g., about 250 nm or less, about 100 nm or less, about 75 nm or less, about 50 nm or less, about 40 nm or less, about 30 nm or less, about 20 nm or less)

Lower etch mask layer 16 is supported by grating layer 14. Lower etch mask layer 16 can be used to protect grating layer 14 during wet and/or dry etching steps (see discussion below). Lower etch mask layer 16 can be formed using a variety of processes. For example, in some embodiments, lower etch mask layer 16 can be formed using ALD. In certain embodiments, lower etch mask layer 16 can be formed using other techniques such as CVD (e.g., plasma-enhanced CVD), PVD, sputtering, and electron beam evaporation.

Lower etch mask layer 16 can be formed from a variety of materials. For example, in some embodiments, lower etch mask layer 16 is formed from $SiO_2$. In certain embodiments, lower etch mask layer 16 can be formed from materials such as $Al_2O_3$, $HfO_2$, $Ta_2O_5$, $TiO_2$, $Si_3N_4$, $SiN_x$, and $SiON_x$ or metals (e.g., Cr, Ti, Ni).

The thickness of lower etch mask layer 16 in the z-direction can generally be chosen as desired to provide various functions in multilayer article 10 such as, for example, to protect grating layer 14. In some embodiments, the thickness of lower etch mask layer 16 is about 20 nm or more (e.g., about 25 nm or more, about 30 nm or more, about 35 nm or more). In certain embodiments, the thickness of lower etch mask layer 16 is about 100 nm or less (e.g., about 80 nm or less, about 60 nm or less, about 50 nm or less).

Sacrificial layer 18 is supported by lower etch mask layer 16. Sacrificial layer 18 can be formed from a variety of materials. In general, sacrificial layer 18 can be formed from any of the materials suitable for forming grating layer 14. In some embodiments, sacrificial layer 18 and grating layer 14 are formed from the same material, such as aluminum or another metal. In other embodiments, sacrificial layer 18 and grating layer 14 are formed from different materials.

Sacrificial layer 18 can be formed using a variety of techniques. In general, any of the processes used to form grating layer 14 can be used to form sacrificial layer 18. In certain embodiments, for example, sacrificial layer 18 can be formed using ALD, CVD, plasma-enhanced CVD, PVD, sputtering, or electron beam evaporation.

The thickness of sacrificial layer 18 in the z-direction can generally be chosen as desired. Typically, for example, the thickness of sacrificial layer 18 can be chosen to produce a high aspect ratio periodic structure. In some embodiments, the thickness of sacrificial layer 18 is about 50 nm or more (e.g., about 75 nm or more, about 100 nm or more, about 125 nm or more, about 150 nm or more). In certain embodiments, the thickness of sacrificial layer 18 is about 1000 nm or less (e.g., about 800 nm or less, about 600 nm or less, about 500 nm or less, about 400 nm or less).

Upper etch mask layer 20 is supported by sacrificial layer 18. Upper etch mask layer 20 can be used to protect sacrificial layer 18 during certain fabrication steps. Upper etch mask layer 20 can be formed using a variety of processes. For example, in some embodiments, upper etch mask layer 20 can be formed using ALD. In certain embodiments, upper etch mask layer 20 can be formed using other techniques such as CVD, plasma-enhanced CVD, PVD, sputtering, or electron beam evaporation.

Upper etch mask layer 20 can be formed from a variety of materials. For example, in some embodiments, upper etch mask layer 20 is formed from $SiO_2$. In certain embodiments, upper etch mask layer 20 can be formed from $Al_2O_3$, $HfO_2$, $Ta_2O_5$, $TiO_2$, $Si_3N_4$, $SiN_x$, and $SiON_x$.

The thickness of upper etch mask layer 20 in the z-direction can generally be chosen as desired. Typically, for example, the thickness of upper etch mask layer 20 can be chosen to provide various functions such as protection for sacrificial layer 18. In some embodiments, the thickness of upper etch mask layer 20 is about 20 nm or more (e.g., about 25 nm or more, about 30 nm or more, about 35 nm or more). In certain embodiments, the thickness of upper etch mask layer 20 is about 100 nm or less (e.g., about 80 nm or less, about 60 nm or less, about 50 nm or less).

Photoresist layers 21 and 22 are positioned atop upper etch mask layer 20. Photoresist layer 21 is an anti-reflection layer that reduces an amount of light (e.g., lithographic exposure light) that is reflected from the surface of multilayer article 10. Suitable materials for forming anti-reflection layer 21 include polymers such as XHRiC, commercially available from Brewer Science, Inc.

Photoresist layer 22 is an imaging layer. The properties of the imaging layer are altered by exposure to light at particular wavelengths. Suitable materials for forming imaging layer 22 include commercially-available photoresists such as AZ1805, AZ1809, and AZ1815, available from Clariant or Shipley, or polymers such as polymethylmethacrylate (PMMA) and polystyrene (PS). AZ photoresists can be developed using commercially-available developers, such as AZ300 MIF from Clariant.

Photoresist layers 21 and 22 can be formed using a variety of techniques. Suitable methods for forming layers 21 and 22 include spin coating, dip coating, and vapor deposition.

The thickness of photoresist layers 21 and 22 in the z-direction can generally be chosen as desired. Typically, the thickness of photoresist layer 21 is chosen to provide efficient anti-reflection properties, and the thickness of photoresist layer 22 is chosen to ensure that a well-defined periodic structure is produced by exposure of layer 22. In some embodiments, the thickness of photoresist layer 22 in the z-direction is about 100 nm to 200 nm.

In some embodiments, multilayer article 10 may have only a single photoresist layer which functions as an imaging layer. Any of the materials used to form photoresist layer 22, as discussed above, can be used to form such an imaging layer.

Figure 2:
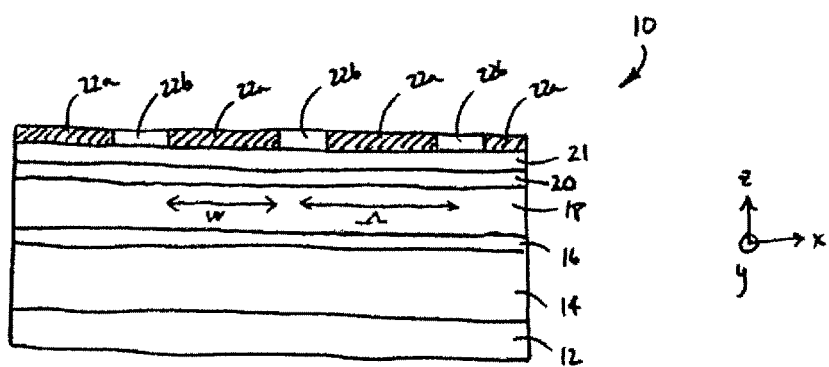
FIG. 2 is a side view of the multilayer article of FIG. 1 after optical exposure of the photoresist layer.

Turning now to methods for forming a grating structure in grating layer 14, in certain embodiments, in a first process step, a grating pattern is transferred to resist layer 22 of multilayer article 10 by, for example, electron beam lithography, nano-imprint lithography, or photolithography (e.g., using a photomask or using holographic techniques). For example, in some embodiments, holographic interference lithography is used to expose a series of parallel regions of photoresist layer 22. FIG. 2 shows multilayer article 10 with exposed regions 22a and unexposed regions 22b of photoresist layer 22. Exposed regions 22a have a width w in the x-direction and extend along the y-direction. Exposed regions 22a are generally parallel to one another along the y-direction.

The exposure pattern of photoresist layer 22 forms a periodic structure having a period $\Lambda$ in the x-direction. As shown in FIG. 2, exposed regions 22a form rows that extend along the y-direction, and $\Lambda$ corresponds to a center-to-center spacing between successive rows in the x-direction. In general, the period $\Lambda$ can be selected by changing the properties of the lithography system (e.g., the optical interference pattern in holographic interference lithography) used to pattern photoresist layer 22. For example, in the embodiment shown in FIG. 2, the period $\Lambda$ in the x-direction is about 400 nm or less (e.g., about 300 nm or less, about 200 nm or less, about 150 nm or less, about 100 nm), although exposure patterns having different periods can also be produced. After exposure, the exposed resist layer 22 is developed to remove exposed regions 22a (where the resist material is a positive resist). In certain embodiments, a negative resist can be used and unexposed regions 22b are removed.

The width w of regions 22a in the x-direction can generally be chosen as desired for particular applications. In general, the width w and period $\Lambda$ are chosen together to produce a particular pattern in photoresist layer 22. The ratio $w/\Lambda$ can vary as desired. In some embodiments, the ratio $w/\Lambda$ is about 1/5 or more (e.g., about 1/4 or more, about 1/3 or more, about 2/5 or more, about 1/2 or more, about 3/5 or more, about 2/3 or more, about 3/4 or more, about 4/5 or more).

Lithographic techniques such as holographic interference lithography and other lithography techniques can be used to produce a relatively large-area pattern. For example, in some embodiments, the patterned region of photoresist layer 22 can extend for about 25 mm or more (e.g., about 50 mm or more, about 60 mm or more, about 70 mm or more, about 100 mm or more, about 150 mm or more, about 200 mm or more, about 250 mm or more, about 300 mm or more, about 400 mm or more) in each of the x- and y-directions.

Subsequently, the regions of upper etch mask layer 20 that are no longer covered by photoresist layer 22 are etched. Suitable techniques for etching upper etch mask layer 20 include RIE (e.g., fluoride RIE using etchants such as $CHF_3$, $CF_4$, or $C_2F_6$, for example) ion beam etching, sputtering etching, chemical assisted ion beam etching, and wet etching.

Following the etching of upper etch mask layer 20, portions of sacrificial layer 18 that are no longer covered by upper etch mask layer 20 are etched. In general, sacrificial layer 18 can be etched using a variety of different processes. For example, in some embodiments, sacrificial layer 18 can be etched using a reactive dry etching process using one or more gases such as chlorine gas.

Figure 3:
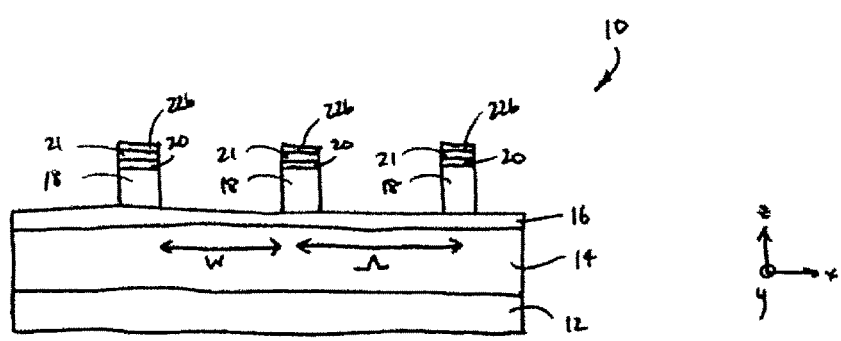
FIG. 3 is a side view of the multilayer article of FIG. 2 after removal of the exposed photoresist and underlying layers.

FIG. 3 shows the results of the removal of exposed regions 22*a* of photoresist layer 22, followed by successive etching of corresponding regions of upper etch mask layer 20 and sacrificial layer 18. Sacrificial layer 18, at this stage, is composed of a series of periodic rows extending along the y-direction with a period Λ in the x-direction. The positions and spacings of the rows correspond to the exposure pattern of photoresist layer 22. The remaining portions of sacrificial layer 18 are spaced apart by a distance w in the x-direction.

Figure 4:
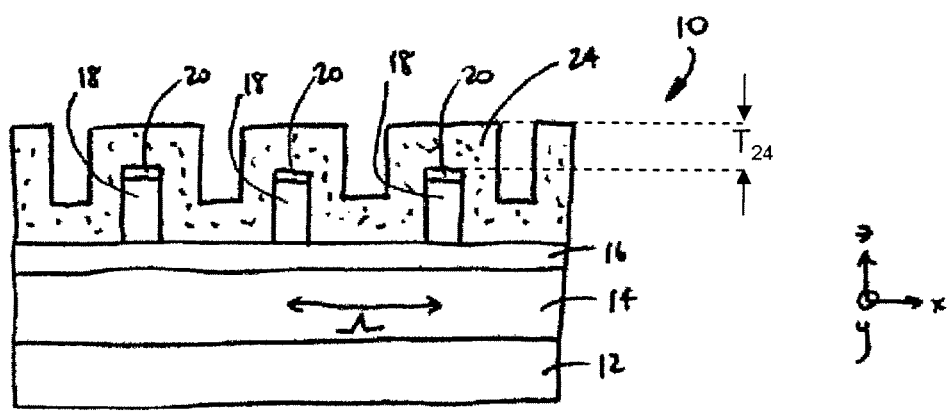
FIG. 4 is a side view of the multilayer article of FIG. 3 after a conformal coating step.

Next, the regions of unexposed photoresist 22*b* are removed from multilayer article 10 using a technique such as solvent rinsing (e.g., in an organic solvent such as acetone or an alcohol), oxygen plasma ashing, oxygen RIE, or ozone cleaning. Then, a conformal coating layer 24 is deposited atop the rows as shown in FIG. 4. Conformal coating layer 24 is deposited using ALD. Exemplary ALD processes are discussed infra. In some embodiments, conformal coating layer 24 is deposited using plasma enhanced CVD or HD CVD In general, the conformal coating material can be chosen from a variety of materials. In certain embodiments, the conformal coating material acts as a mask while etching grating layer 14, so should be selected to be compatible with this function. For example, in embodiments where grating layer 14 is a metal, such as aluminum, the conformal coating material can be $SiO_2$, which is resistant to various metal etchants.

In some embodiments, conformal coating layer 24 can include $SiO_2$. In certain embodiments, conformal coating layer 24 can include $SiO_2$, $Si_3N_4$, $SiN_x$, $SiON_x$, and other materials. In some embodiments, conformal coating layer 24 is formed from more than one material. For example, conformal coating layer 24 can be formed from a nanolaminate material.

The thickness of conformal coating layer 24 can generally be selected as desired. The thickness refers to the depth of conformal coating layer as measured in the z-direction from the top of conformal coating layer 24 to the top surface of etch stop layer 20, as indicated by $T_{24}$ in FIG. 4. As discussed infra, the thickness of conformal coating layer 24 affects the dimensions of the grating structure ultimately formed in grating layer 14. Thus, the thickness of conformal coating layer 24 is usually selected based on the desired structure of the grating to be formed. In some embodiments, the thickness of conformal coating layer 24 can be about 10 nm or more, about 20 nm or more (e.g., about 30 nm or more, about 40 nm or more, about 50 nm or more, about 60 nm or more, about 70 nm or more, about 80 nm or more, about 90 nm or more, about 100 nm or more). In certain embodiments, the thickness of conformal coating layer 24 can be about 200 nm or less (e.g., about 150 nm or less, about 125 nm or less, about 100 nm or less).

Figure 5:
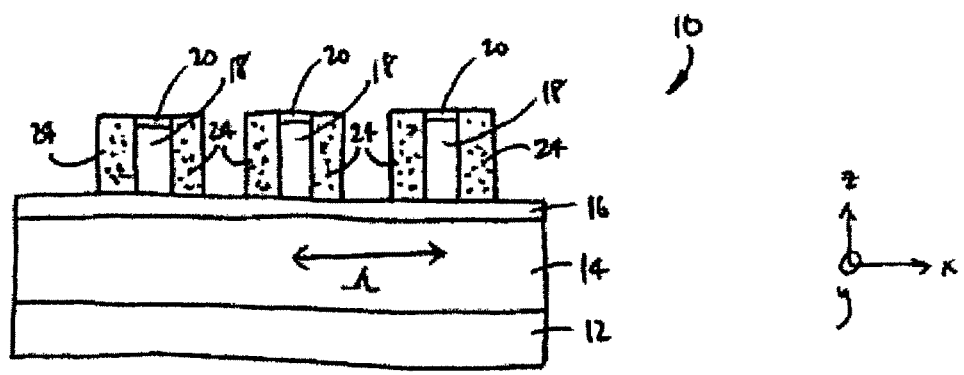
FIG. 5 is a side view of the multilayer article of FIG. 4 after an anisotropic etching step.

Following deposition of conformal coating layer 24, the conformal coating material is anisotropically etched to remove portions of conformal coating layer 24 on the tops of the rows formed by sacrificial layer 18, and between the rows formed by sacrificial layer 18. Anisotropic etching refers to etching processes where etch rates along different directions vary. For example, in the anisotropic etching processes used to etch conformal coating layer 24, the etch rate in the z-direction should be greater than the etch rate orthogonal to the z-direction. Thus, the anisotropic etching process does not substantially etch the conformal coating material adjacent to the sides of the rows formed by sacrificial layer 18. The results of the anisotropic etching process are shown in FIG. 5.

In some embodiments, the selective etching process employed to remove portions of conformal coating layer 24 is a dry etching process, such as reactive ion etching (RIE), ion beam etching, sputtering etching, or chemical assisted ion beam etching.

Figure 6:
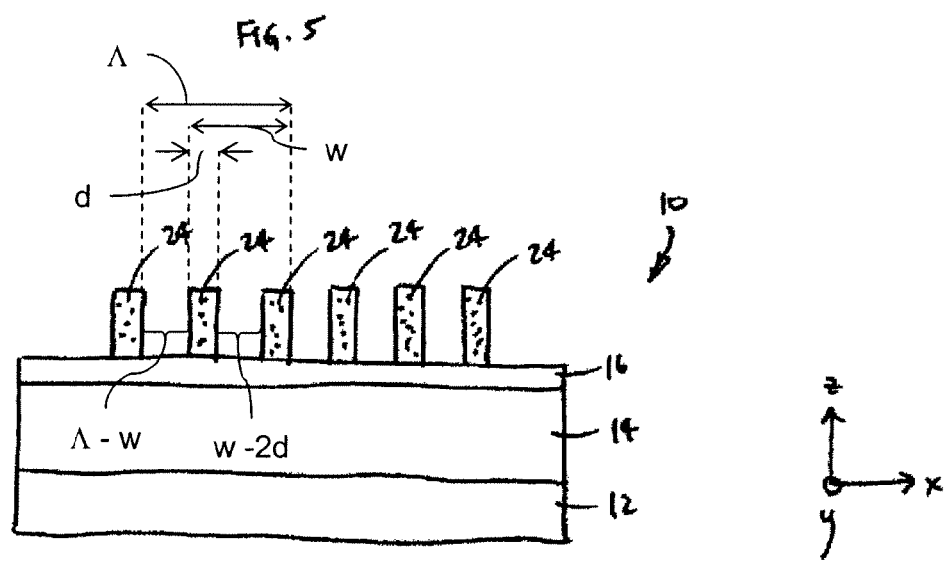
FIG. 6 is a side view of the multilayer article of FIG. 5 after selective etching of sacrificial layer material.

After removal of the portions of conformal coating layer 24 on the tops of the rows and between the rows formed by sacrificial layer 18, the remaining portions of upper etch mask layer 20 and the rows formed by sacrificial layer 18 can be selectively removed. Suitable processes for performing these selective etching steps include, for example, one or more separate dry etching processes (e.g., RIE, ion beam etching, sputtering etching, chemical assisted ion beam etching, or selective wet etching). The results of a dry etching process to remove the remaining portions of upper etch mask layer 20 and sacrificial layer 18 are shown in FIG. 6. Multilayer article 10 now includes rows formed from the material of conformal coating layer 24 and extending along the y-direction. The rows remaining from conformal coating layer 24 have a thickness d in the x-direction. Rows that were formed on opposing sides of the same portion of sacrificial layer 18 are separated by a distance Λ−w in the x-direction. Rows that were formed on facing sides of adjacent portions of sacrificial layer 18 are separated by a distance w−2d in the x-direction. Accordingly, in embodiments where d=w−Λ/2, the rows of conformal coating material form a grating with a period of Λ/2.

In other words, a new periodic structure has been produced that has a spatial frequency that is larger by a factor of 2 than the spatial frequency of the initial periodic structure.

In general, the relative sizes of d, w, and Λ−w can vary as desired, depending on the structure to be formed in grating layer 14. In some embodiments, d can be about 0.1 or more (e.g., about 0.2 or more, about 0.3 or more, about 0.4 or more) times w. In certain embodiments, d can be about 0.1 or more (e.g., about 0.2 or more, about 0.3 or more, about 0.4 or more, about 0.5 or more, about 0.6 or more, about 0.7 or more, about 0.8 or more, about 0.9 or more, about 1 or more) times Λ−w.

The new periodic structure is transferred to grating layer 14. To transfer the new periodic structure to grating layer 14, a series of etching steps is performed. First, lower etch stop layer 16 is etched between the rows formed from the material of conformal coating layer 24. Suitable methods for selectively etching etch stop layer 16 include dry etching methods (e.g., using $CHF_3$, $CF_4$, and other gases), RIE, ion beam etching, sputtering etching, and other chemical assisted ion beam etching methods.

After the portions of etch stop layer 16 between the rows formed from the material of conformal coating layer 24 have been removed, the exposed portions of grating layer 14 are selectively etched to transfer the new periodic structure thereto. Grating layer 14 can be selectively etched via dry etching techniques that use gases such as chlorine gas, for example. Other selective etching techniques that can be used include RIE, ion beam etching, sputtering etching, chemical assisted ion beam etching, and other techniques.

Figure 7:
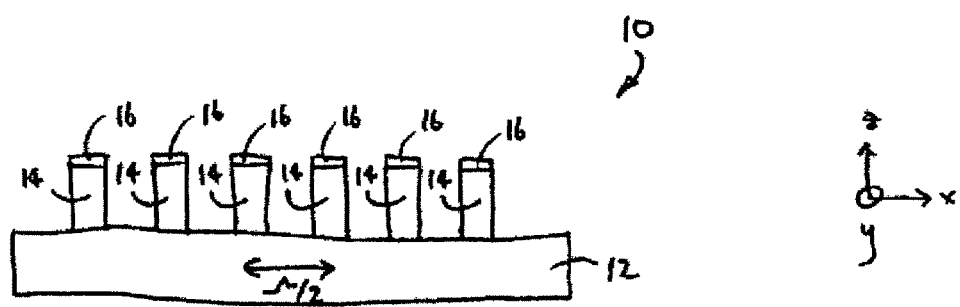
FIG. 7 is a side view of the multilayer article of FIG. 6 after transferring a periodic structure to a grating layer of the multilayer article.

Finally, the rows formed from the material of conformal coating layer 24 can be selectively removed using dry etching methods that use fluorine-containing gases (e.g., $CHF_3$, $CF_4$, and other gases), RIE, ion beam etching, sputtering etching, and other chemical assisted ion beam etching methods. The multilayer article 10 which results from these successive etching steps is shown in FIG. 7. Multilayer article 10 now includes rows formed from the material of grating layer 14, extending along the y-direction, and spaced from one another in the x-direction by an amount Λ/2 to form a periodic structure. If the material of grating layer 14 includes a material such as aluminum, for example, then multilayer article 10 forms an aluminum grating that can be used as a functional optical element in a variety of optical devices that are useful for manipulating light at UV wavelengths.

As discussed previously, the thickness of grating layer 14 can be controlled to produce periodic structures having different aspect ratios. In particular, using the methods disclosed herein, the aspect ratio of the periodic structure (e.g., the ratio of the thickness of the rows in the z-direction to the width of the rows in the x-direction) can be about 1:1 or more (e.g., about 2:1 or more, about 5:1 or more, about 10:1 or more, about 20:1 or more).

In the embodiments shown in FIGS. 1-7, the period of the periodic structure formed in grating layer 14 is about 100 nm after starting from a photoresist exposure pattern produced by interference lithography having a period of about 200 nm. In other embodiments, however, the initial exposure pattern can have a period less than about 200 nm (e.g., less than about 180 nm, less than about 170 nm, less than about 160 nm, less than about 150 nm, less than about 125 nm, less than about 100 nm, less than about 80 nm, less than about 60 nm, less than about 50 nm, less than about 40 nm). The periodic structure formed in grating layer 14 as a result can have a period of less than about 100 nm (e.g., less than about 90 nm, less than about 85 nm, less than about 80 nm, less than about 75 nm, less than about 50 nm, less than about 40 nm, less than about 30 nm, less than about 20 nm). In certain embodiments, multilayer article 10 can include more than one sacrificial layer. For example, multilayer article 10 can include two or more (e.g., three or more, four or more, five or more, ten or more) sacrificial layers. Each successive sacrificial layer can be used to further reduce the period of the periodic structure that is finally formed in grating layer 14. For example, if multilayer article 10 includes two sacrificial layers and a grating layer, then a periodic structure with period Λ formed by interference lithography (or other techniques) in the photoresist layer can be used to fabricate a periodic structure with period Λ/4 in the grating layer. As an example, where FIGS. 1-6 show a periodic structure with period Λ=200 nm produced via optical lithography, and converted into a periodic structure with period 100 nm and formed from the material of conformal coating layer 24. The periodic structure formed from the material of conformal coating layer 24 is then transferred to grating layer 14, as shown in FIG. 7. However, if multilayer article 10 includes a second sacrificial layer, then the periodic structure formed from the material of conformal coating layer 24 can instead be transferred to the second sacrificial layer. A second conformal coating step can be performed, followed by selective etching steps to produce a new periodic structure formed of conformal coating material and having a period of about 50 nm. This periodic structure can then be transferred to grating layer 14.

In general, multiple sacrificial layers can be present in multilayer article 10 to produce periodic structures having very small periods. In particular, periodic structures formed from aluminum or other metals and having periods of 50 nm or less (e.g., 40 nm or less, 30 nm or less, 20 nm or less, 10 nm or less) can be produced.

Figure 8A:
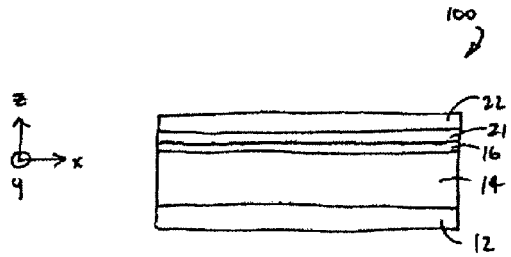
FIGS. 8A-8G show successive side views of a multilayer article following a series of fabrication steps that produce a periodic structure in the multilayer article.
Figure 8B:
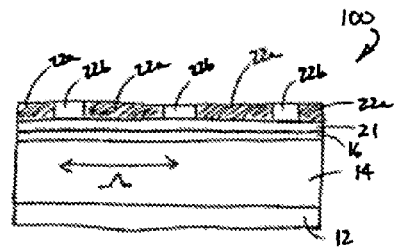
Figure 8C:
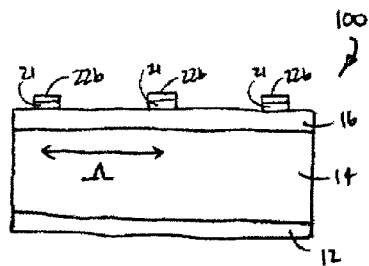

Variations of the methods disclosed above are also possible. In some embodiments, multilayer article 10 may not include all of the layers shown in FIG. 1. For example, in certain embodiments, photoresist layer 22 can be supported directly by lower etch stop layer 16, and multilayer article 10 may not include sacrificial layer 18 or upper etch stop layer 20. FIGS. 8A-8G show a series of steps that are used to produce a grating directly in grating layer 14 without the use of sacrificial layer 18. In FIG. 8A, a multilayer article 100 includes substrate 12, grating layer 14, lower etch stop layer 16, and photoresist layer 22. Photoresist layer 22 is exposed (e.g., using an optical interference technique such as holographic interference lithography or another technique) to expose portions 22a of photoresist layer 22, as shown in FIG. 8B. Where photoresist layer 22 is a positive (negative) resist, exposed (unexposed) portions 22a are removed in a subsequent developing step to produce a series of rows, as shown in FIG. 8C, formed from the unexposed photoresist material 22b. The rows extend along the y-direction and are spaced from one another along the x-direction by an amount Λ, forming a structure that is periodic in the x-direction.

A conformal coating layer 24 is applied to unexposed photoresist portions 22b and lower etch stop layer 16. Conformal coating layer 24 can be deposited using ALD, for example, or by using another of the techniques disclosed previously. In certain embodiments, degradation of unexposed photoresist portions 22b can be prevented via the use of low temperature ALD to deposit conformal coating layer 24. Certain photoresist materials include organic materials that degrade or decompose at the relatively high temperatures employed in CVD and other deposition techniques. However, ALD can be used to deposit a conformal coating layer 24 of a material such as $Ta_2O_5$ or $Al_2O_3$ at relatively low temperature (e.g., less than about 100° C.). Photoresist materials are typically resistant to degradation at these moderate temperatures.

Figure 8D:
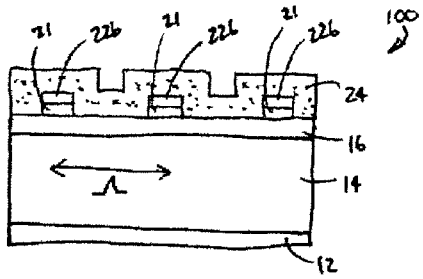
Figure 8E:
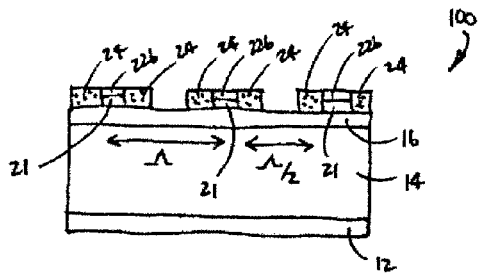

Following deposition of conformal coating layer 24 (the results of which are shown in FIG. 8D), the conformal coating layer material on the tops of the rows formed by unexposed photoresist portions 22b and in the valleys between the rows formed by unexposed photoresist portions 22b is preferentially removed using the anisotropic etching techniques disclosed previously. As a result, the remaining material of conformal coating layer 24 forms a second set of rows, where each row in the second set of rows is in contact with one of the rows formed by the unexposed photoresist portions 22b, as shown in FIG. 8E. If the widths of the unexposed photoresist portions 22b in the x-direction are chosen to be Λ/4 during the exposure step, and the thickness of conformal coating layer 24 is chosen to be Λ/4 during the deposition step, then successive rows in the second set of rows are spaced from one another the x-direction by an amount Λ/2. Selective removal of the unexposed photoresist portions 22b (e.g., by solvent rinsing, oxygen plasma etching, or other techniques) yields a periodic structure formed by the second set of rows, as shown in FIG. 8F, with a period of Λ/2 in the x-direction.

Figure 8F:
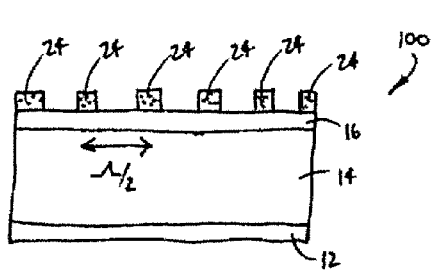
Figure 8G:
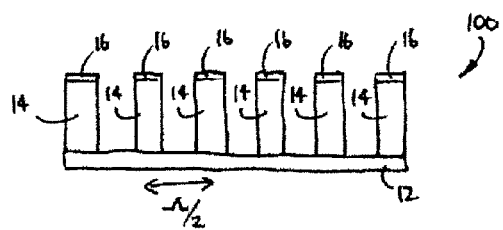

The periodic structure shown in FIG. 8F, formed from the material of conformal coating layer 24 (e.g., $Ta_2O_5$), can then be transferred to grating layer 14 using successive etching steps, as discussed previously. The resulting periodic structure formed in multilayer article 100 is shown in FIG. 8G.

As discussed previously, in some embodiments, holographic lithography techniques can be used to form a pattern in a photoresist layer 22. In these techniques, a photosensitive resist layer is exposed to an interference pattern formed by overlapping two or more coherence beams of radiation, usually derived from a laser light source. The varying light intensity of the interference pattern is transferred to the resist material, which can be developed after exposure to provide a patterned resist layer.

Holographic lithography can be used to generate a period intensity pattern by interfering two coherent beams of similar intensity. The technique is particularly versatile as the period of the intensity pattern can be varied by varying the angle at which the two beams interfere.

Theoretically, the period of the intensity pattern, Γ, is given by the equation:

$$\Gamma = \frac{\lambda_b}{2n\sin\varphi},$$

where $\lambda_b$ is the wavelength of the interfering radiation, n is the refractive index of the medium in which the beams interfere, and φ is half the angle subtended by the interfering beams. Since Γ is proportional to $\lambda_b$, interference patterns having relatively short periods (e.g., about 300 nm or less) can be formed by selecting a light source with a relatively short wavelength (e.g., an argon laser having output at 351 nm). Furthermore, the interference pattern period can be reduced by interfering the two beams at relatively large angles (e.g., φ about 45 degrees or more). For example, the resist can be exposed to two 351 nm beams with φ at about 61 degrees to provide a grating having a period of about 200 nm.

In some embodiments, holographic interference lithography can be performed while immersing the substrate and resist in a medium having a refractive index higher than the refractive index of air. For example, the resist surface can be immersed in a liquid such as water (which has a refractive index of about 1.33) or an organic liquid (e.g., glycerin, which has a refractive index of about 1.5)

Figure 9:
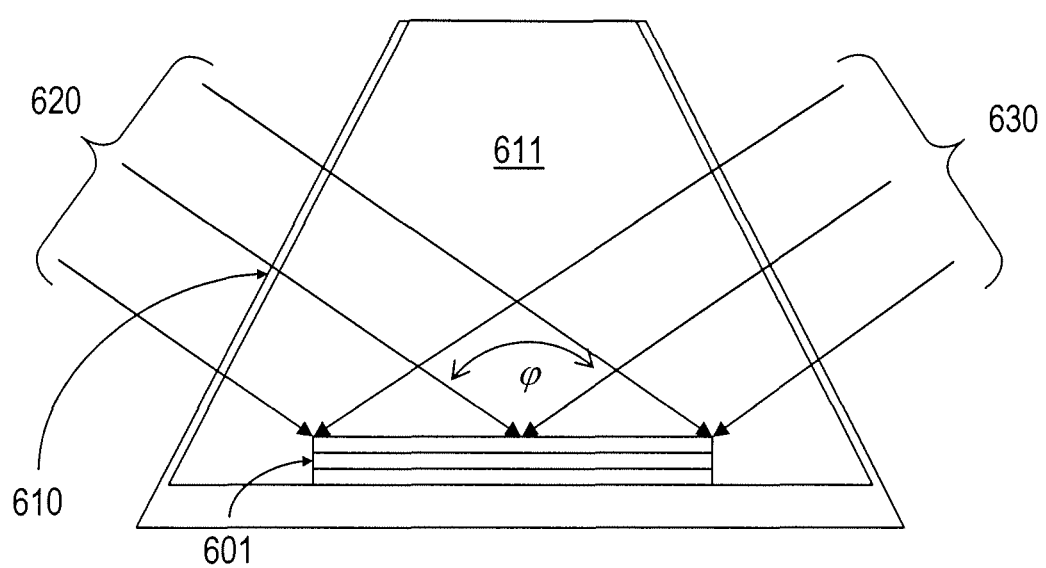
FIG. 9 is a schematic diagram showing exposure of an article in immersion holographic lithography.

For example, referring to FIG. 9, immersion holographic lithography can be performed by immersing a multilayer article 601 in a container 610 filled with a liquid 611, such as water or glycerin, and exposing the article to an interference pattern while it is immersed. The interference pattern is formed by interfering coherent beams 620 and 630 at angle φ.

The walls of container 610 can be oriented so that beams 620 and 630 are substantially normally incident. Alternatively, or additionally, certain walls of container 610 can include an antireflection coating to reduce reflection of beams 620 and 630.

Typically, the beams are expanded to provide an interference pattern sufficiently large to expose multilayer article 601 in a single exposure. In some embodiments, the beams can be expanded to have a diameter of several inches (e.g., about 4 inches or more, about 6 inches or more, about 8 inches or more).

Figure 10:
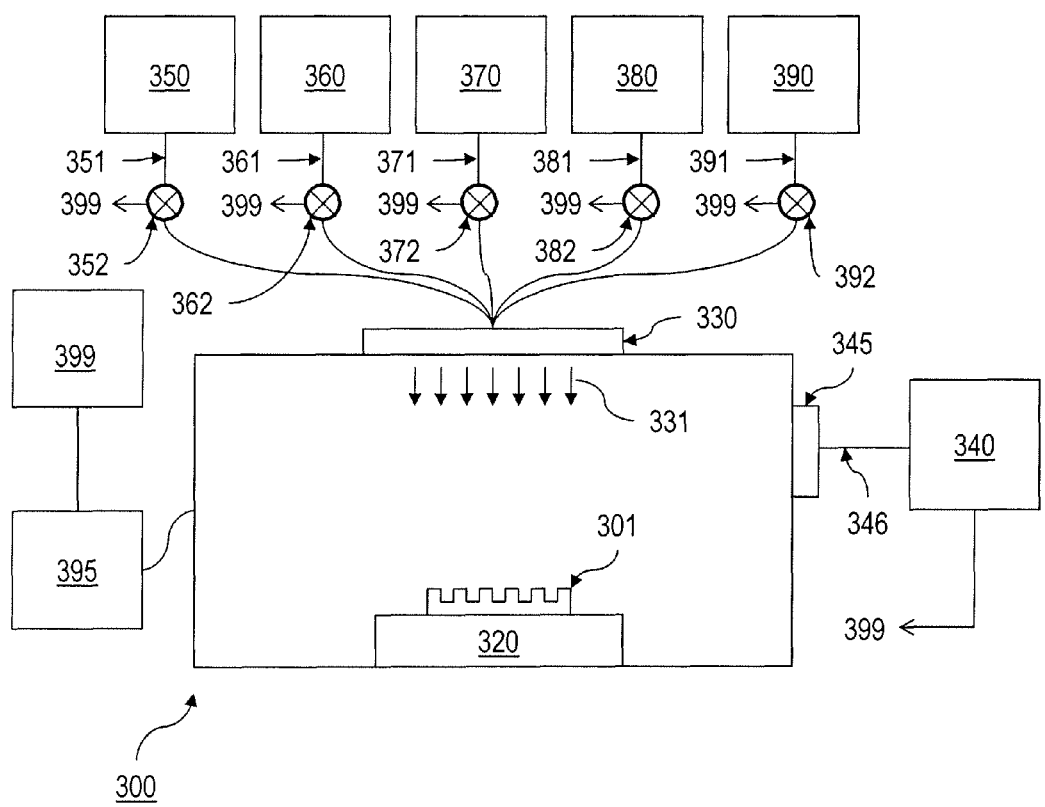
FIG. 10 is a schematic diagram of an atomic layer deposition system.

As mentioned previously, in some embodiments, various layers of multilayer article 10 and 100, as well as conformal coating layer 24, are prepared using atomic layer deposition (ALD). As an example, referring to FIG. 10, an ALD system 300 is used to deposit a conformal coating layer on an article 301 that includes a layer that has been etched to form a grating. Deposition of the conformal coating layer occurs monolayer by monolayer, providing substantial control over the composition and thickness of the conformal coating layer. During deposition of a monolayer, vapors of a precursor are introduced into the chamber and are adsorbed onto exposed surfaces of article 301 or previously deposited monolayers adjacent these surfaces. Subsequently, a reactant is introduced into the chamber that reacts chemically with the adsorbed precursor, forming a monolayer of a desired material. The self-limiting nature of the chemical reaction on the surface can provide precise control of film thickness and large-area uniformity of the deposited layer. Moreover, the non-directional adsorption of precursor onto each exposed surface provides for uniform deposition of material onto the exposed surfaces, regardless of the orientation of the surface relative to chamber 110. Accordingly, the layers of the conformal coating layer conform to the shape of the grating of article 301.

In the described example, ALD system 300 is configured to deposit two different materials onto article 301, e.g., as a nanolaminate film. Of course, layers composed of only one material can be deposited using the same or similar systems. ALD system 300 includes a reaction chamber 310, which is connected to sources 350, 360, 370, 380, and 390 via a manifold 330. Sources 350, 360, 370, 380, and 390 are connected to manifold 330 via supply lines 351, 361, 371, 381, and 391, respectively. Valves 352, 362, 372, 382, and 392 regulate the flow of gases from sources 350, 360, 370, 380, and 390, respectively. Sources 350 and 380 contain a first and second precursor, respectively, while sources 360 and 390 include a first reagent and second reagent, respectively. Source 370 contains a carrier gas, which is constantly flowed through chamber 310 during the deposition process transporting precursors and reagents to article 301, while transporting reaction byproducts away from the substrate. Precursors and reagents are introduced into chamber 310 by mixing with the carrier gas in manifold 330. Gases are exhausted from chamber 310 via an exit port 345. A pump 340 exhausts gases from chamber 310 via an exit port 345. Pump 340 is connected to exit port 345 via a tube 346.

ALD system 300 includes a temperature controller 395, which controls the temperature of chamber 310. During deposition, temperature controller 395 elevates the temperature of article 301 above room temperature. In general, the temperature should be sufficiently high to facilitate a rapid reaction between precursors and reagents, but should not damage the substrate. In some embodiments, the temperature of article 301 can be about 500° C. or less (e.g., about 400° C. or less, about 300° C. or less, about 200° C. or less, about 150° C. or less, about 125° C. or less, about 100° C. or less).

Typically, the temperature should not vary significantly between different portions of article 301. Large temperature variations can cause variations in the reaction rate between the precursors and reagents at different portions of the substrate, which can cause variations in the thickness and/or morphology of the deposited layers. In some embodiments, the temperature between different portions of the deposition surfaces can vary by about 40° C. or less (e.g., about 30° C. or less, about 20° C. or less, about 10° C. or less, about 5° C. or less).

Deposition process parameters are controlled and synchronized by an electronic controller 399. Electronic controller 399 is in communication with temperature controller 395; pump 340; and valves 352, 362, 372, 382, and 392. Electronic controller 399 also includes a user interface, from which an operator can set deposition process parameters, monitor the deposition process, and otherwise interact with system 300.

Figure 11:
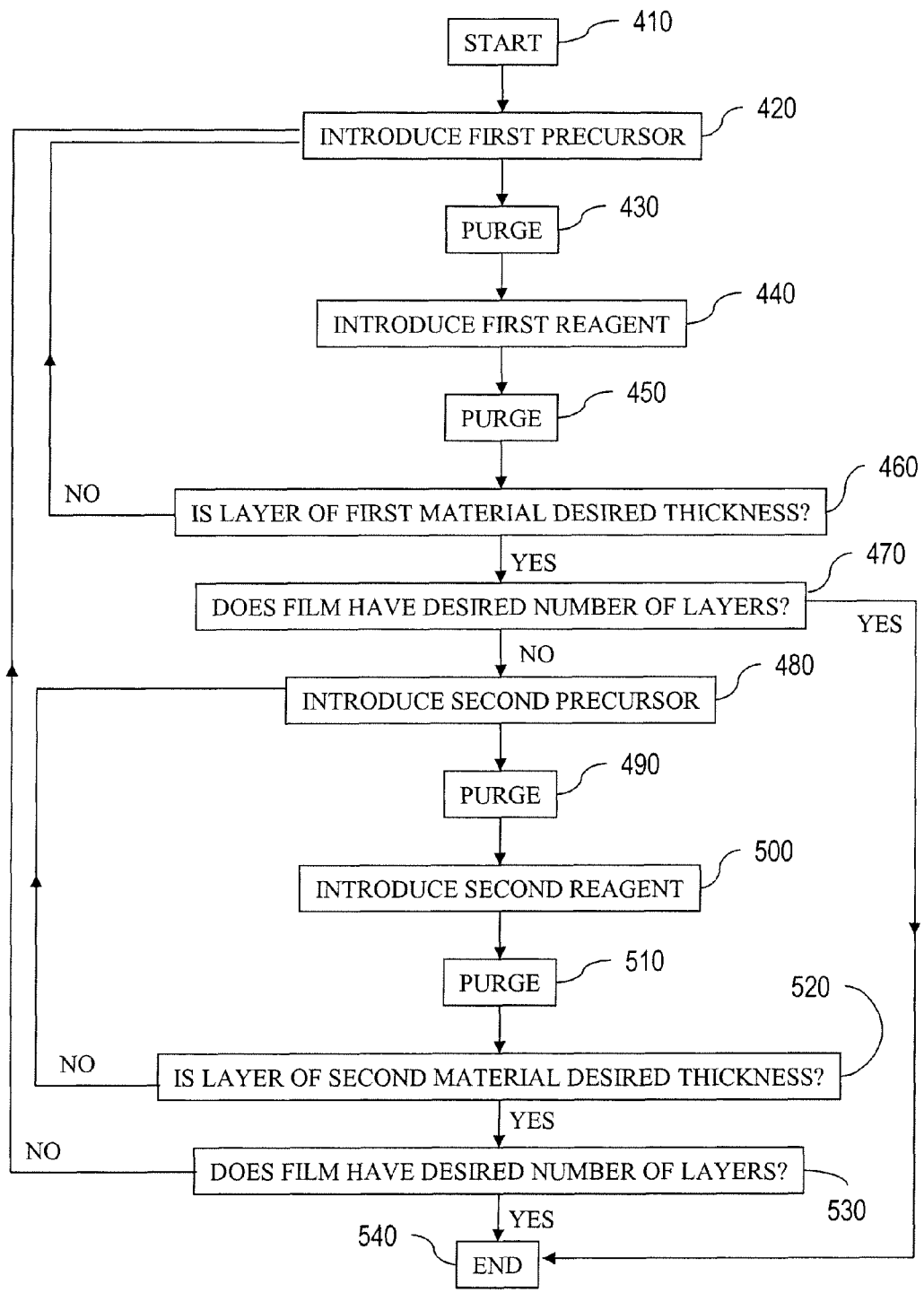
FIG. 11 is a flow chart showing steps for forming a nanolaminate using atomic layer deposition.

Referring to FIG. 11, the ALD process is started (410) when system 300 introduces the first precursor from source 350 into chamber 310 by mixing it with carrier gas from source 370 (420). A monolayer of the first precursor is adsorbed onto exposed surfaces of article 301, and residual precursor is purged from chamber 310 by the continuous flow of carrier gas through the chamber (430). Next, the system introduces a first reagent from source 360 into chamber 310 via manifold 330 (440). The first reagent reacts with the monolayer of the first precursor, forming a monolayer of the first material. As for the first precursor, the flow of carrier gas purges residual reagent from the chamber (450). Steps 420 through 460 are repeated until the layer of the first material reaches a desired thickness (460).

In embodiments where the deposited films are a single layer of material, the process ceases once the layer of first material reaches the desired thickness (470). However, for a nanolaminate film, the system introduces a second precursor into chamber 310 through manifold 330 (380). A monolayer of the second precursor is adsorbed onto the exposed surfaces of the deposited layer of first material and carrier gas purges the chamber of residual precursor (490). The system then introduces the second reagent from source 380 into chamber 310 via manifold 330. The second reagent reacts with the monolayer of the second precursor, forming a monolayer of the second material (500). Flow of carrier gas through the chamber purges residual reagent (510). Steps 580 through 510 are repeated until the layer of the second material reaches a desired thickness (520).

Additional layers of the first and second materials are deposited by repeating steps 520 through 530. Once the desired number of layers are formed (e.g., the trenches are filled and/or cap layer has a desired thickness), the process terminates (540), and the coated article is removed from chamber 310.

Although the precursor is introduced into the chamber before the reagent during each cycle in the process described above, in other examples the reagent can be introduced before the precursor. The order in which the precursor and reagent are introduced can be selected based on their interactions with the exposed surfaces. For example, where the bonding energy between the precursor and the surface is higher than the bonding energy between the reagent and the surface, the precursor can be introduced before the reagent. Alternatively, if the binding energy of the reagent is higher, the reagent can be introduced before the precursor.

The thickness of each monolayer generally depends on a number of factors. For example, the thickness of each monolayer can depend on the type of material being deposited. Materials composed of larger molecules may result in thicker monolayers compared to materials composed of smaller molecules.

The temperature of the article can also affect the monolayer thickness. For example, for some precursors, a higher temperate can reduce adsorption of a precursor onto a surface during a deposition cycle, resulting in a thinner monolayer than would be formed if the substrate temperature were lower.

The type or precursor and type of reagent, as well as the precursor and reagent dosing can also affect monolayer thickness. In some embodiments, monolayers of a material can be deposited with a particular precursor, but with different reagents, resulting in different monolayer thickness for each combination. Similarly, monolayers of a material formed from different precursors can result in different monolayer thickness for the different precursors.

Examples of other factors which may affect monolayer thickness include purge duration, residence time of the precursor at the coated surface, pressure in the reactor, physical geometry of the reactor, and possible effects from the byproducts on the deposited material. An example of where the byproducts affect the film thickness are where a byproduct etches the deposited material. For example, HCl is a byproduct when depositing $TiO_2$ using a $TiCl_4$ precursor and water as a reagent. HCl can etch the deposited $TiO_2$ before it is exhausted. Etching will reduce the thickness of the deposited monolayer, and can result in a varying monolayer thickness across the substrate if certain portions of the substrate are exposed to HCl longer than other portions (e.g., portions of the substrate closer to the exhaust may be exposed to byproducts longer than portions of the substrate further from the exhaust).

Typically, monolayer thickness is between about 0.1 nm and about five nm. For example, the thickness of one or more of the deposited monolayers can be about 0.2 nm or more (e.g., about 0.3 nm or more, about 0.5 nm or more). In some embodiments, the thickness of one or more of the deposited monolayers can be about three nm or less (e.g., about two nm, about one nm or less, about 0.8 nm or less, about 0.5 nm or less).

The average deposited monolayer thickness may be determined by depositing a preset number of monolayers on a substrate to provide a layer of a material. Subsequently, the thickness of the deposited layer is measured (e.g., by ellipsometry, electron microscopy, or some other method). The average deposited monolayer thickness can then be determined as the measured layer thickness divided by the number of deposition cycles. The average deposited monolayer thickness may correspond to a theoretical monolayer thickness. The theoretical monolayer thickness refers to a characteristic dimension of a molecule composing the monolayer, which can be calculated from the material's bulk density and the molecules molecular weight. For example, an estimate of the monolayer thickness for $SiO_2$ is ~0.37 nm. The thickness is estimated as the cube root of a formula unit of amorphous $SiO_2$ with density of 2.0 grams per cubic centimeter.

In some embodiments, average deposited monolayer thickness can correspond to a fraction of a theoretical monolayer thickness (e.g., about 0.2 of the theoretical monolayer thickness, about 0.3 of the theoretical monolayer thickness, about 0.4 of the theoretical monolayer thickness, about 0.5 of the theoretical monolayer thickness, about 0.6 of the theoretical monolayer thickness, about 0.7 of the theoretical monolayer thickness, about 0.8 of the theoretical monolayer thickness, about 0.9 of the theoretical monolayer thickness). Alternatively, the average deposited monolayer thickness can correspond to more than one theoretical monolayer thickness up to about 30 times the theoretical monolayer thickness (e.g., about twice or more than the theoretical monolayer thickness, about three time or more than the theoretical monolayer thickness, about five times or more than the theoretical monolayer thickness, about eight times or more than the theoretical monolayer thickness, about 10 times or more than the theoretical monolayer thickness, about 20 times or more than the theoretical monolayer thickness).

During the deposition process, the pressure in chamber 310 can be maintained at substantially constant pressure, or can vary. Controlling the flow rate of carrier gas through the chamber generally controls the pressure. In general, the pressure should be sufficiently high to allow the precursor to saturate the surface with chemisorbed species, the reagent to react completely with the surface species left by the precursor and leave behind reactive sites for the next cycle of the precursor. If the chamber pressure is too low, which may occur if the dosing of precursor and/or reagent is too low, and/or if the pump rate is too high, the surfaces may not be saturated by the precursors and the reactions may not be self limited. This can result in an uneven thickness in the deposited layers. Furthermore, the chamber pressure should not be so high as to hinder the removal of the reaction products generated by the reaction of the precursor and reagent. Residual byproducts may interfere with the saturation of the surface when the next dose of precursor is introduced into the chamber. In some embodiments, the chamber pressure is maintained between about 0.01 Torr and about 100 Torr (e.g., between about 0.1 Torr and about 20 Torr, between about 0.5 Torr and 10 Torr, such as about 1 Torr).

Generally, the amount of precursor and/or reagent introduced during each cycle can be selected according to the size of the chamber, the area of the exposed substrate surfaces, and/or the chamber pressure. The amount of precursor and/or reagent introduced during each cycle can be determined empirically.

The amount of precursor and/or reagent introduced during each cycle can be controlled by the timing of the opening and closing of valves 352, 362, 382, and 392. The amount of precursor or reagent introduced corresponds to the amount of time each valve is open each cycle. The valves should open for sufficiently long to introduce enough precursor to provide adequate monolayer coverage of the substrate surfaces. Similarly, the amount of reagent introduced during each cycle should be sufficient to react with substantially all precursor deposited on the exposed surfaces. Introducing more precursor and/or reagent than is necessary can extend the cycle time and/or waste precursor and/or reagent. In some embodiments, the precursor dose corresponds to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more). Similarly, the reagent dose can correspond to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more).

The time between precursor and reagent doses corresponds to the purge. The duration of each purge should be sufficiently long to remove residual precursor or reagent from the chamber, but if it is longer than this it can increase the cycle time without benefit. The duration of different purges in each cycle can be the same or can vary. In some embodiments, the duration of a purge is about 0.1 seconds or more (e.g., about 0.2 seconds or more, about 0.3 seconds or more, about 0.4 seconds or more, about 0.5 seconds or more, about 0.6 seconds or more, about 0.8 seconds or more, about one second or more, about 1.5 seconds or more, about two seconds or more). Generally, the duration of a purge is about 10 seconds or less (e.g., about eight seconds or less, about five seconds or less, about four seconds or less, about three seconds or less).

The time between introducing successive doses of precursor corresponds to the cycle time. The cycle time can be the same or different for cycles depositing monolayers of different materials. Moreover, the cycle time can be the same or different for cycles depositing monolayers of the same material, but using different precursors and/or different reagents. In some embodiments, the cycle time can be about 20 seconds or less (e.g., about 15 seconds or less, about 12 seconds or less, about 10 seconds or less, about 8 seconds or less, about 7 seconds or less, about 6 seconds or less, about 5 seconds or less, about 4 seconds or less, about 3 seconds or less). Reducing the cycle time can reduce the time of the deposition process.

The precursors are generally selected to be compatible with the ALD process, and to provide the desired deposition materials upon reaction with a reagent. In addition, the precursors and materials should be compatible with the material on which they are deposited (e.g., with the substrate material or the material forming the previously deposited layer). Examples of precursors include chlorides (e.g., metal chlorides), such as $TiCl_4$, $SiCl_4$, $SiH_2Cl_2$, $TaCl_3$, $HfCl_4$, $InCl_3$ and $AlCl_3$. In some embodiments, organic compounds can be used as a precursor (e.g., Ti-ethaOxide, Ta-ethaOxide, Nb-ethaOxide). Another example of an organic compound precursor is $(CH_3)_3Al$. For $SiO_2$ deposition, for example, suitable precursors include Tris(tert-butoxy), Tris(tert-pentoxy) silanol, or tetraethoxysilane (TEOS).

The reagents are also generally selected to be compatible with the ALD process, and are selected based on the chemistry of the precursor and material. For example, where the material is an oxide, the reagent can be an oxidizing agent. Examples of suitable oxidizing agents include water, hydrogen peroxide, oxygen, ozone, $(CH_3)_3Al$ and various alcohols (e.g., Ethyl alcohol $CH_3OH$). Water, for example, is a suitable reagent for oxidizing precursors such as $TiCl_4$ to obtain $TiO_2$, $AlCl_3$ to obtain $Al_2O_3$, and Ta-ethaoxide to obtain $Ta_2O_5$, Nb-ethaoxide to obtain $Nb_2O_5$, $HfCl_4$ to obtain $HfO_2$, $ZrCl_4$ to obtain $ZrO_2$, and $InCl_3$ to obtain $In_2O_3$. In each case, HCl is produced as a byproduct. In some embodiments, $(CH_3)_3Al$ can be used to oxidize silanol to provide $SiO_2$.

While certain embodiments have been described, other implementations are also possible. For example, in some embodiments, rather than use etched conformal coating layer 24 as a mask to transfer a pattern to grating layer 14, the etched conformal coating layer itself can provide a functional layer in the final article. In embodiments where conformal coating layer 24 is formed from layers of more than one material (e.g., nanolaminate films), etched conformal coating layer 24 can provide a grating where each row of material varies in composition along the x-axis.

Embodiments can include one or more additional layers than those described above. For example, additional layers can be formed on the article after the grating has been etched. In some embodiments, one or more protective layers (e.g., polymer hardcoat, or oxide layers) can be formed over the grating. In certain embodiments, the spaces between the rows of the grating can be filled with one or more materials. These spaces can be completely or partially filled. In some embodiments, ALD can be used to deposit material between the rows of the grating. Methods depositing material in this manner are described, for example, in U.S. Patent Application Publication No. 2005-0275944 A1, entitled "OPTICAL FILMS AND METHODS OF MAKING THE SAME," filed on Jun. 11, 2004, and in U.S. Patent Application Publication No. US 2005-0277063 A1, entitled "OPTICAL FILMS AND METHODS OF MAKING THE SAME," filed on May 27, 2005, the entire contents both of which is incorporated herein by reference.

The foregoing embodiments are directed to forming grating structures that are periodic in one dimension (i.e., along the x-direction). More generally, the described methods can be used to form structures that are quasi-periodic (e.g., characterized by two or more incommensurate periods) and/or aperiodic in one or more dimensions. In some embodiments, the methods can be used to form structures whose relative spacing along at least one direction can be mathematically described by more than one spatial period, as opposed to the structures described above which can be characterized by a single period, $\Lambda$. In some embodiments, the spacing of structures can be modulated to provide, for example, a chirped grating. In general, the structure of the article will depend on the application for which it is designed.

The methods disclosed herein can be used to form optical devices, such as polarizers and retarders. For example, gratings formed from metals can be used to polarize incident light having wavelengths longer than the grating period. Correspondingly, gratings formed from dielectric materials, for example, can be used to retard incident light having wavelengths longer than the grating period. Accordingly, by forming gratings of appropriate period, polarizers and/or retarders can be formed for different regions of the electromagnetic spectrum. In some embodiments, polarizers and/or retarders can be formed for the visible (e.g., for wavelengths between about 400 nm and 700 nm) or ultraviolet (e.g., from about 100 nm to about 400 nm) portions of the spectrum.

In certain embodiments, gratings can be integrated with other optically functional layers. For example, where the grating is designed to operate as a polarizer, it can be integrated with a retarder and/or a filter.

Optical devices and systems that include functional elements such as periodic structures are disclosed, for example, in U.S. Patent Application Publication Nos. 2005-0275944 A1 and 2005-0277063 A1, mentioned supra, and in U.S. Patent Application Publication No. 2005-0045799 A1, entitled "OPTICAL RETARDERS AND RELATED DEVICES AND SYSTEMS," filed on Aug. 13, 2004; U.S. patent application Ser. No. 10/989,448, entitled "GRATINGS, RELATED OPTICAL DEVICES AND SYSTEMS, AND METHODS OF MAKING SUCH GRATINGS," field on Nov. 12, 2004; U.S. Patent Application Publication No. 2006-0127829 A1, entitled "STRUCTURES FOR POLARIZATION AND BEAM CONTROL," filed on Nov. 3, 2005; and U.S. patent application Ser. No. 11/300,887, entitled "OPTICAL RETARDERS AND METHODS OF MAKING THE SAME," filed on Dec. 15, 2005, the entire contents of which are incorporated herein by reference. One or more of the structures discussed above can be included as functional elements in such devices and systems.

Other embodiments are in the claims.

What is claimed is:

1. A method of forming patterned structures for optical devices, comprising:
   using atomic layer deposition to form a first layer comprising a first material over a surface of a second layer, wherein forming the first layer comprises sequentially forming a plurality of monolayers of the first material over the surface of the second layer, wherein the second layer comprises a plurality of rows of a second material extending along a first direction and spaced from one another in a second direction orthogonal to the first direction, wherein the first layer conforms to the surface of the second layer, and wherein the first material includes a dielectric material having metal oxide; and
   removing portions of the first layer to produce a plurality of rows of the first material extending along the first direction and spaced from one another in the second direction and to form an optical device that includes the metal oxide; and
   removing portions of a third layer comprising a third material, where the portions of the third layer correspond to intervals between the plurality of rows of the second material so that removing the portions forms a plurality of rows of the third material extending along the first direction and spaced apart from one another,
   wherein the first and second materials are different.

2. The method of claim 1, wherein the optical device is selected from the list consisting of a polarizer, an optical filter, a beamsplitter, and a retarder, and the rows of the second material are arranged periodically in the second direction with a period Λ.

3. The method of claim 2, wherein the rows of the first material are arranged periodically in the second direction with a period λ.

4. The method of claim 3, wherein λ is smaller than Λ.

5. The method of claim 4, wherein λ is about Λ/2.

6. The method of claim 2, wherein Λ is about 200 nm or less.

7. The method of claim 2, wherein Λ is about 150 nm or less.

8. The method of claim 1, wherein a width in the second direction of each row of the second material is about Λ/4.

9. The method of claim 1, wherein a thickness of the first layer in a third direction orthogonal to the first and second directions is about Λ/4.

10. The method of claim 1, wherein the metal oxide of the first material includes $TiO_2$.

11. The method of claim 1, wherein the second material is an inorganic material.

12. The method of claim 1, wherein the second material is a metal.

13. The method of claim 1, wherein the second material is a dielectric material.

14. The method of claim 1, wherein the third material is at least one of an inorganic material or an organic material.

15. The method of claim 1, wherein the third material is a metal.

16. The method of claim 15, wherein the metal is aluminum.

17. The method of claim 1, wherein the rows of the second material are formed by:
   exposing portions of a layer of a resist to radiation to produce an exposure pattern in the layer of the resist;
   removing portions of the layer of the resist to produce a plurality of rows of the resist extending along the first direction and spaced apart from each other; and
   removing portions of the second material that correspond to removed portions of the layer of the resist to form the rows of the second material.

18. The method of claim 1, wherein removing portions of the first layer comprises etching the first layer.

19. The method of claim 18, wherein the first layer is etched anisotropically.

20. The method of claim 1, wherein removing portions of the third layer comprises etching the third layer.

21. The method of claim 20, wherein the third material layer is etched with chlorine gas.

22. The method of claim 1, wherein the rows of the third material form a grating with a grating period of about 100 nm or less.

23. The method of claim 1, wherein the rows of the third material form a grating with a grating period of about 50 nm or less.

24. The method of claim 1, further comprising depositing a fourth material between the rows of the third material, wherein the third and fourth materials are different.

25. The method of claim 1, further comprising forming one or more additional layers over the rows of the third material.

26. The method of claim 1, wherein the rows of the third material form a layer that is birefringent for light of wavelength λ propagating through the layer along an axis, wherein λ is between 100 nm and 2,000 nm.

27. The method of claim 1, wherein the first, second and third materials, and periodicity of the rows of the first, second and third materials are selected such that the device transmits about 50% or more of light of wavelength λ having a first polarization state incident on a layer along a path, and blocks about 80% or more of light of wavelength λ having a second polarization state incident on the layer along the path, the first and second polarization states being orthogonal, and λ is between about 100 nm and about 400 nm.

28. The method of claim 1, further comprising forming a grating layer from the rows of the third material.

29. The method of claim 1, wherein the first layer is an optical device grating formed from the dielectric material.

30. The method of claim 1, wherein the first material includes a combination of $TiO_2$ and $Al_2O_3$.

31. The method of claim 1, wherein the method further comprises:
  removing portions of the second layer; and
  removing the portions of the third layer corresponding to the removed portions of the resist layer prior to using the atomic layer deposition to form the first layer, wherein the second layer includes a resist layer.

32. The method of claim 31, further comprising:
  forming the first layer on remaining portions of the resist layer and the third layer, respectively.

* * * * *